T. E. BARNUM.
MOTOR CONTROLLER.
APPLICATION FILED JULY 26, 1909.
1,064,809.
Patented June 17, 1913.
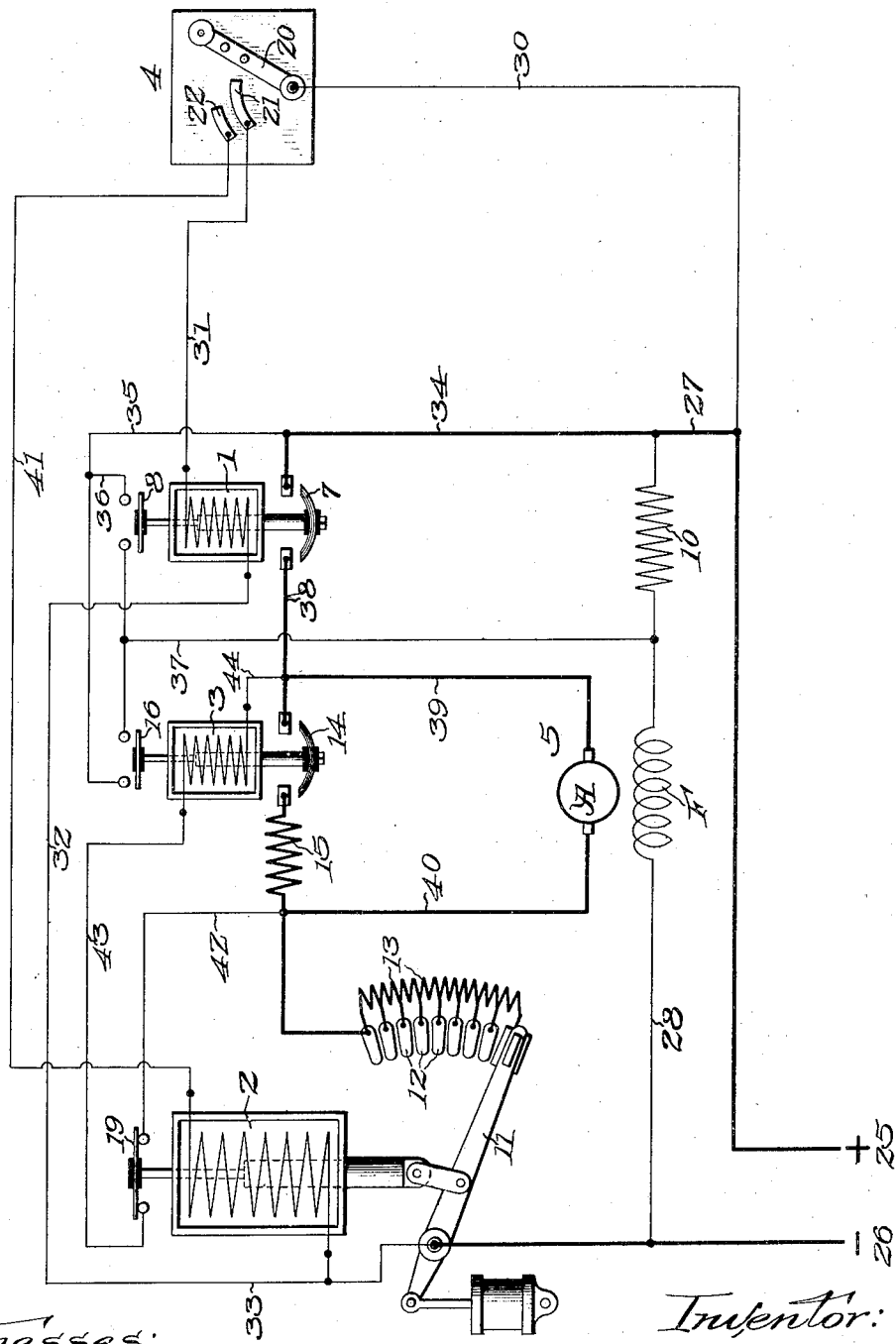
Witnesses:
George Haynes
S. W. Fitzgerald
Inventor:
Thomas E. Barnum.
By Edwin B. H. Tower, Jr.
Attorney.

UNITED STATES PATENT OFFICE.

THOMAS E. BARNUM, OF MILWAUKEE, WISCONSIN, ASSIGNOR TO THE CUTLER-HAMMER MFG. CO., OF MILWAUKEE, WISCONSIN, A CORPORATION OF WISCONSIN.

MOTOR-CONTROLLER.

1,064,809.  Specification of Letters Patent.  Patented June 17, 1913.

Application filed July 25, 1909. Serial No. 509,538.

*To all whom it may concern:*

Be it known that I, THOMAS E. BARNUM, a citizen of the United States, residing at Milwaukee, in the county of Milwaukee and State of Wisconsin, have invented new and useful Improvements in Motor-Controllers, of which the following is a full, clear, concise, and exact description, reference being had to the accompanying drawing, forming a part of this specification.

My invention relates to improvements in controllers for electric motors, and more particularly to a controller for a motor having a shunt field winding.

Broadly my invention comprehends means for controlling the circuits of both the motor armature and shunt field winding from a distant point, or points.

In my prior application, Serial No. 499,422, filed June 1st, 1909, I have disclosed means controllable from a distant point for opening and closing the circuits of both the motor armature and shunt field winding. While such an arrangement is practical for many purposes, the fact that the shunt field circuit is normally opened, requires a considerable time for the field winding to build up to full strength. This necessarily retards the starting of the motor.

It is, therefore, the object of my present invention to provide means whereby the flow of current through the shunt field winding may be reduced while the motor is inoperative without entirely disconnecting said winding from circuit. With this arrangement a sufficient flow of current may be maintained through the shunt field winding to cause the same to quickly build up to full strength when it is desired to start the motor.

A further object of my invention is to provide means for establishing a dynamic braking circuit for the motor, maintaining the shunt field winding fully energized during the braking period, and then automatically reducing the flow of current through said winding when the motor comes to rest.

Various other objects and advantages of my invention will be hereinafter set forth.

For the purpose of more fully disclosing the characteristic features of my invention, I shall describe the controller diagrammatically illustrated in the accompanying drawing. Of course, the controller illustrated merely embodies one form of my invention which is susceptible of various modifications.

The controller illustrated includes a main switch 1, a rheostat 2, a dynamic braking switch 3 and a master switch 4. These switches are arranged to control a motor 5, which, as illustrated, is provided with an armature A and a shunt field winding F. Although I have shown a plain shunt wound motor, it should be understood that certain features of my invention are equally as applicable to compound wound motors.

The main switch 1 is provided with a contact member 7 adapted to engage a pair of stationary contacts to complete the circuit of the motor armature in the manner hereinafter set forth. In addition to the contact 7, the main switch 1 is provided with an auxiliary contact 8 arranged to engage a pair of stationary contacts to shortcircuit a resistance 10, which, as will be hereinafter explained, is normally included in circuit with the shunt field winding F of the motor. The main switch 1 has an operating winding arranged to be controlled by the master switch 4 in the manner hereinafter set forth.

The rheostat 2, as illustrated, merely comprises an electromagnetically operated resistance controlling element 11 arranged to be moved over a series of contacts 12 to control a starting resistance 13 connected in series with the motor armature. The circuit of the operating winding of this device is also controlled by the master switch. While the device 2 in the present instance is merely provided for starting purposes, it should be understood that the same might be constructed for speed regulation also. In fact, any desired form of starting or speed regulating device might be used in connection with my controller.

The dynamic braking switch 3 is provided with a contact 14 adapted to engage a pair of stationary contacts to complete a circuit across the terminals of the motor armature including a resistance 15. In addition to the contact member 14, the dynamic braking switch is provided with an auxiliary contact 16, the function of which, as will be hereinafter explained, is the same as that of the auxiliary contact 8 of main switch 1. As will be hereinafter more clearly set forth, the operating winding of the dynamic braking switch is connected across the terminals of the motor armature, its circuit being controlled by an auxiliary switch 19 operated by the rheostat 2.

In practice, the master switch may assume any preferred form. As illustrated, however, this switch merely comprises a movable contact member 20 adapted, when moved from the position illustrated, to first engage a contact segment 21 and then a contact segment 22. The contact member 20 coöperates with the segment 21 to control the circuit of the operating winding of the main switch, while said contact member coöperates with the contact segment 22 to control the circuit of the operating winding of the rheostat 2.

I shall now describe the operation of the controller, at the same time clearly explaining the circuit connections therefor.

Assuming that current is supplied to the motor and to the operating windings of the several switches from main lines 25 and 26, when the master switch is in the position illustrated, the motor will be at rest and the several switches deënergized. Under these conditions, however, a circuit will extend from main line 25 by conductor 27 through resistance 10, and the shunt field winding F of the motor, by conductor 28 to main line 26. It will thus be seen that even when the motor is at rest a certain amount of current will always flow through the shunt field winding thereof, the amount of current depending upon the resistance 10. It will, therefore, readily be seen that the resistance 10 may be adjusted to permit any predetermined amount of current to normally flow through the shunt field winding of the motor. To start the motor, it is necessary to move the element 20 of the master switch into engagement with segment 21. This completes a circuit from main line 25, by conductor 30 through the element 20 of the master switch to contact segment 21, by conductor 31, through the operating winding of main switch 1, and by conductors 32 and 33 to main line 26. This, of course, causes the energization of the main switch 1, which thereupon closes. Upon closure of main switch 1 a shortcircuit is established around the resistance 10. This short circuit may be traced from one terminal of said resistance, by conductors 34, 35 and 36 through the auxiliary switch 8 of main switch 1, by conductor 37 to the opposite terminal of the resistance. Consequently, upon closure of the main switch, full line potential will be impressed upon the shunt field winding, thereby causing the same to quickly build up in strength. Also upon closure of main switch 1 circuit is closed from main line 25, by conductors 27 and 34, through the main contact 7, of switch 1, by conductors 38 and 39, through the motor armature A, by conductor 40, through the starting resistance 13 and the element 11 of the rheostat 2 to main line 26. The motor is thus started with all of the starting resistance in circuit. However, if the element 20 of the master switch be moved into engagement with contact segment 22, circuit will be closed from the master switch by conductor 41, through the operating winding of the rheostat 2 to the main line 26. Thereupon the rheostat responds and gradually removes the resistance 13 from circuit. This brings the motor up to normal speed.

When it is desired to stop the motor, the master switch should first be disengaged from contact segment 22, thereby opening the circuit of the operating winding of the rheostat. This causes the movable element of the rheostat to descend, thereby reinserting the starting resistance in the motor circuit. When the rheostat returns to normal position, the auxiliary switch 19, actuated thereby, is brought into engagement with its stationary contacts, thereby completing a circuit from one terminal of the motor armature by conductors 40 and 42, through said switch 19, by conductor 43, through the operating winding of the dynamic braking switch, by conductors 44 and 39 to the opposite terminal of the motor armature. Thus the operating winding of the dynamic braking switch is connected in parallel to the motor armature. If the dynamic braking switch responds, as it will if its circuit is closed before the main switch is opened, or, if the motor is driven as a generator under the inertia of its load, it will complete a dynamic braking circuit across the motor armature. This braking circuit may be traced from one terminal of the motor armature by conductor 39 through contact 14 of the dynamic braking switch and resistance 15, by conductor 40, to the opposite terminal of the motor armature. Also when the dynamic braking switch is closed, the auxiliary contact 16 thereof establishes a short circuit around the auxiliary contact 8 of main switch 1. If, now, the master switch is moved to cause the deënergization of the main switch, the motor armature will be disconnected from circuit. However, the shunt field winding will not be weakened owing to the fact that the auxiliary contact 16 of the braking switch maintains the short circuit around the resistance 10. Consequently, the motor is quickly brought to rest by the dynamic braking current generated thereby. Of course, as the motor comes to rest the current generated thereby becomes insufficient to maintain the dynamic braking switch closed. Upon opening of the dynamic braking switch, the short circuit around the resistance 10 is opened, thereby reinserting the same in circuit with the shunt field winding of the motor.

Having thus described my invention, what I claim and desire to secure by Letters Patent, is:—

1. In a controller for an electric motor having a shunt field winding, in combination, a resistance adapted to be included in the shunt field circuit, and automatic means controlling said resistance, said means insuring the exclusion of said resistance from circuit while the motor is supplied with electrical power and rendering subsequent inclusion of said resistance subject to the electrical conditions in the motor.

2. In a controller for an electric motor having a shunt field winding, in combination, a resistance included in the shunt field circuit and means insuring the exclusion of said resistance from the shunt field circuit upon closure of the motor circuit and during operation of the motor as a dynamic brake.

3. In a controller for an electric motor having a shunt field winding, in combination, automatic means tending to weaken the excitation of the shunt field winding without interruption of its circuit upon opening of the motor armature circuit and automatic means rendering said first mentioned means ineffective to weaken the excitation of the shunt field winding under predetermined conditions.

4. In a controller for an electric motor having a shunt field winding, in combination, means for establishing a dynamic braking circuit for the motor, a resistance, and means for automatically inserting said resistance in circuit with the shunt field winding of the motor when the motor is brought to rest.

5. In a controller for an electric motor having a shunt field winding, in combination, a resistance, means tending to insert said resistance in the shunt field circuit of the motor when the motor armature is disconnected from circuit, and means for establishing a dynamic braking circuit for the motor and maintaining the shunt field winding substantially fully energized until the motor is stopped.

6. In a controller for an electric motor having a shunt field winding, in combination, a resistance, means controllable from a distance for disconnecting the motor armature from circuit, and tending to insert said resistance in circuit with the shunt field winding of the motor, and automatic means for establishing a dynamic braking circuit for the motor and rendering said first mentioned means ineffective to insert said resistance in circuit until the motor is substantially brought to rest.

7. In a controller for an electric motor having a shunt field winding, in combination, means tending to weaken the excitation of the shunt field winding without interrupting its circuit upon disconnection of the motor from circuit and automatic means responsive to the electrical conditions in the motor for rendering said first mentioned means temporarily ineffective under predetermined conditions.

8. In a controller for an electric motor having a shunt field winding in combination, a resistance normally included in the shunt field circuit when the armature circuit is open and automatic means determining the time of inclusion of said resistance in the shunt field circuit.

9. In a controller for an electric motor having a shunt field winding, in combination, a resistance included in the motor circuit, means for establishing a dynamic braking circuit for the motor and shortcircuiting said resistance, said means being adapted to automatically open the short circuit around said resistance when the motor is stopped.

10. In a controller for an electric motor having a shunt field winding, in combination, a resistance connected in circuit with the shunt field winding of the motor, and an electroresponsive switch having its operating winding connected across the terminals of the motor armature, said switch being adapted to respond to complete dynamic braking circuit for the motor armature and to shortcircuit said resistance.

11. In a controller for an electric motor having a shunt field winding, in combination, a resistance in circuit with the shunt field winding of the motor, an electroresponsive switch for completing the circuit of the motor armature and shortcircuiting said resistance, a dynamic braking switch having an operating winding adapted to be connected across the terminals of the motor armature, said dynamic braking switch being arranged to maintain a short circuit around said resistance after said first mentioned switch is opened, and to automatically open the short circuit around said resistance when the motor is stopped.

12. In a controller for an electric motor having a shunt field winding, in combination, means tending to weaken the shunt field winding of the motor without interrupting the circuit thereof and automatic means controlling said first mentioned means to insure full field strength of the motor until the motor is brought substantially to rest.

13. A controller for an electric motor comprising means for weakening the shunt field winding of the motor without opening its circuit but insuring full shunt field strength upon starting the motor, said means being ineffective to subsequently weaken the shunt field winding until the motor armature is disconnected from circuit and the speed of the motor is decreased to a predetermined degree.

14. In a controller for an electric motor having a shunt field winding, in combination, a resistance connected in circuit with the shunt field winding of the motor, means for starting the motor and insuring exclusion of said resistance from the shunt field circuit upon closure of the armature circuit, and means establishing a dynamic braking circuit for the motor and insuring the exclusion of said resistance while said dynamic braking circuit is maintained.

In witness whereof, I have hereunto subscribed my name in the presence of two witnesses.

T. E. BARNUM.

Witnesses:
 FRANK H. HUBBARD,
 F. W. FITZ GERALD.